United States Patent [19]

Herbrechtsmeier et al.

[11] Patent Number: 4,986,630

[45] Date of Patent: Jan. 22, 1991

[54] OPTICAL WAVEGUIDES

[75] Inventors: Peter Herbrechtsmeier, Königstein/Taunus; Jürgen Theis; Gerhard Wieners, both of Frankfurt am Main, all of Fed. Rep. of Germany

[73] Assignee: Hoechst Aktiengesellschaft, Frankfurt am Main, Fed. Rep. of Germany

[21] Appl. No.: 344,320

[22] Filed: Apr. 26, 1989

[30] Foreign Application Priority Data

Apr. 28, 1988 [DE] Fed. Rep. of Germany ....... 3814298

[51] Int. Cl.$^5$ .............................................. G02B 6/00
[52] U.S. Cl. .................................................. 350/96.34
[58] Field of Search ............... 350/96.34, 96.29, 96.30, 350/96.31

[56] References Cited

U.S. PATENT DOCUMENTS 3,993,834  11/1976  Chimura et al. .................... 428/373
4,747,662   5/1988  Fitz ................................... 350/96.32

FOREIGN PATENT DOCUMENTS 97325  1/1984  European Pat. Off. .
0145378  6/1985  European Pat. Off. .
 154339  9/1985  European Pat. Off. .
 171294  2/1986  European Pat. Off. .

*Primary Examiner*—William L. Sikes
*Assistant Examiner*—Robert E. Wise
*Attorney, Agent, or Firm*—Connolly and Hutz

[57] ABSTRACT

An optical waveguide having a core/sheath structure whose sheath comprises a polysiloxane or a terpolymer based on vinylidene fluoride, tetrafluoroethylene and hexafluoropropylene is suitable for transmission paths of ca. 10 to 100 m and can also be used at a temperature above 100° C. without significant reduction of the transmission path.

10 Claims, No Drawings

OPTICAL WAVEGUIDES

The invention relates to optical waveguides (OWG) which are suitable for the transmission of light, for example of light signals for data transmission.

The optical waveguides comprise a core and a sheath, both of which comprise (different) transparent materials, the core material always having a refractive index at least one percent higher than the sheath material. The optical waveguide is generally filamentary and has a circular cross-section. A sheath material having an annular cross-section is applied as a thin layer to the filamentary core.

The materials most frequently used until now for optical waveguides are homopolymers and copolymers of methacrylates for the core and homopolymers and copolymers of methacrylates of alcohols containing fluorine or copolymers of vinylidene fluoride with other monomers containing fluorine, for the sheath.

It is known that polymers containing fluorine, which essentially comprise vinylidene fluoride (VdF), tetrafluoroethylene (TFE) and/or hexafluoropropene (HFP), have been used as sheath materials for optical waveguides which contain homopolymers and copolymers made from methyl methacrylate (MMA), styrene and esters of methacrylic acid with aliphatic alcohols as core material (EP-A 154,339, EP-A 97,325, DE-A 2,455,265). The sheath materials containing fluorine have a tendency to become cloudy due to crystallization of the VdF and TFE components. Moreover, polymers of this type, particularly those with high proportions of HFP, can be tacky and thus unsuitable as OWG sheath material or they have poor adhesion to the core material, particularly when a low proportion of VdF is selected. Copolymers having high proportions of TFE are poorly suited to thermoplastic processing into an OWG sheath.

It is moreover known that the long term service temperature of optical waveguides can be improved if the core and/or the sheath of the optical waveguide is/are crosslinked, after production of the same, using polyfunctional vinyl compounds or aids containing glycidyl groups (EP-A 171,294), optionally under the influence of ionizing radiation. Incompletely converted vinyl compounds can however impair the properties of the optical waveguide on lengthy use, while glycidyl groups increase the water absorption capacity of the core materials.

Moreover, it is known that the long term service temperature of optical waveguides whose core or sheath is formed from a suitable polymer can be increased by treatment with ionizing radiation (JP 61/35,404).

However, it has long been known that polymers which contain MMA develop yellowish brown discoloration and are degraded under the influence of ionizing radiation. The transparency of the core material is thereby impaired and the mechanical properties of the optical waveguide deteriorate.

It is further known that quartz glass optical waveguides having protective sheaths made from polymers have been treated with low energy $\beta$-rays with the aim of crosslinking these polymers, while avoiding changes in the glass which occur on irradiation with high energy $\beta$-rays (EP-A 145,379) and which lead to low light transmission.

It is also known that tubes made from fluorine-containing polymers which contain VdF, TFE and HFP and which are filled with a clear transparent fluid, can be used as optical waveguides (EP-A 246,552).

Finally, it is known that polymers which contain VdF can be crosslinked after thermoplastic processing by reaction of the polymer with the compound Dimethylmethoxyvinylsilane and under the action of water (DE-A 3,327,596).

The object was to provide a highly transparent polymer material made from easily accessible monomers for producing the sheath of optical waveguides which are suitable for transmission paths of 10 to 100 meters and which can also be used at a temperature above 100°C. without significant reduction of the transmission path.

It has now been found that an optical waveguide whose sheath is made from a transparent thermoplastic molding compound which has been irradiated with high energy charged particles and thus crosslinked, can achieve this object.

The invention thus relates to an optical waveguide having a core/sheath structure whose core comprises a polymer with a refractive index n(C) and whose sheath comprises a polymer with a refractive index n(S), where n(C)/n(S) > 1.01, wherein the core comprises a polycarbonate or a polymer which contains units which are derived from styrene, from a substituted styrene, from an acrylate, from a methacrylate or from a fluoroacrylate, and the sheath comprises a polymer which contains units which are derived from siloxanes or from 1-olefins, or, based in each case on the polymer, from 30% to 50% by weight of vinylidene fluoride, from 25% to 55% by weight of tetrafluoroethylene and from 15% to 25% by weight of hexafluoropropylene, and the optical waveguide has been treated with high energy rays of charged primary particles, whose energy has been determined from the formula (I)

$$\log E = (-A + L)/B \tag{I}$$

in which

E is the energy of the particles in MeV and

L is the thickness of the sheath material in $\mu$m, and

A and B are empirically determined parameters which are dependent on the chemical structure of the sheath material and the type of particle used.

The invention further relates to a process for the production of this optical waveguide.

The core of the optical waveguide according to the invention comprises a polycarbonate or a polymer which contains units which are derived from styrene, from a substituted styrene, from an acrylate, from a methacrylate or from a fluoroacrylate. The polymers preferably used are those which have a higher glass transition point than PMMA, through which the long term service temperature of the optical waveguides can be further increased. These include polymers made from methyl $\alpha$-fluoroacrylate (M-FA), made from $\alpha$-fluoroacrylates, methacrylates and acrylates of halogenated phenols, of mono- and bicyclic alcohols, and of halogenated open chain, alicyclic and bicyclic alcohols and copolymers of these compounds with one another or with MMA, with hexafluoroisopropyl $\alpha$-fluoroacrylate or with other $\alpha$-fluoroacrylates and with methacrylates which contain aliphatic or fluorinated aliphatic alcohol components, and polycarbonates. Particularly preferred polymers are those which essentially comprise methyl $\alpha$-fluoroacrylate, $\alpha$-fluoroacrylates, methacrylates and acrylates of tri-, tetra- and pentafluorinated, -chlorinated and -brominated phenols, of 1,4,5,6,7,7-hexachlorobicyclo-(2.2.1)-hept-5-en-2-ol and of 1,4,5,6,7,7-hexabromobicyclo-(2.2.1)-hept-5-en-2-ol, of 1,4,5,6,7-pentachlorobicyclo-(2.2.1)-hept-5-en-2-ol and of 1,4,5,6-tetrachlorobicyclo-(2.2.1)-hept-5-en-2-ol, α-fluoroacrylates and methacrylates of cyclohexanol, of 3,3,5-trimethylcyclohexanol, of 2-methylcyclopentanol, of borneol, of isoborneol, and of norborneol, and copolymers of these esters with (meth)acrylates of aliphatic alcohols, and polycarbonate. Particularly preferred polymers are those which essentially comprise pentachlorophenyl acrylate and pentachlorophenyl methacrylate (PCP-MA), norbornyl methacrylate and comprise 1,4,5,6,7,7-hexachlorobicyclo-(2.2.1)-hept-5-en-2-yl methacrylate, and copolymers of these esters with (meth)acrylates of aliphatic alcohols, and polycarbonates.

The sheath of the optical waveguide according to the invention comprises a polymer which contains units which are derived from siloxanes, from 1-olefins or from vinylidene fluoride (VdF), from tetrafluoroethylene (TFE) and from hexafluoropropylene (HFP). The proportions of these units in the polymer are
VdF 30 to 50, preferably 35% to 45% by weight,
TFE 25 to 55, preferably 35% to 45% by weight and
HFP 15 to 25, preferably 17% to 22% by weight,
based in each case on the total quantity of polymer. The sheath polymer containing siloxane comprises a polysiloxane, preferably poly(dimethylsiloxane). The polymer containing 1-olefin preferably comprises ethylene units, propylene units or 4-methylpentene units, particularly 80% to 60% by weight of ethylene units and 20% to 60% by weight of propylene units or comprises 80% to 100% by weight of 4-methylpentene units and 20% to 0% by weight of other 1-olefin units.

The optical waveguide according to the invention is produced by one of the following processes:
1. The optical waveguide is produced by simultaneous extrusion of the core material and of the sheath material (coextrusion) using a two component die.
2. Initially the core filament is produced by extrusion. Afterwards, the sheath material is applied either in the form of a mixture of the sheath material with a volatile solvent with evaporation of the solvent or by extrusion of the sheath material using an extruder which is equipped for wire coating. In the case of solvent coating, the solvent can either be suitable for producing a homogeneous solution of the sheath polymer or for producing a dispersion or an emulsion of the sheath polymer.

The layer thickness of the sheath of the optical waveguide according to the invention is 3 to 200 μm, preferably 4 to 150 μm, particularly 5 to 100 μm.

After production, the optical waveguide is treated with high energy rays of charged primary particles. The energy of these rays is adjusted according to the thickness of the sheath material, in accordance with the formula I $$\log E = (-A + \log L)/B$$

in which
E is the average energy in MeV and
L is the thickness of the sheath layer and
A and B are empirically determined parameters which are dependent on the chemical structure of the sheath material and the type of particles used.

A is 0.35 to 1.60 and
B is 1.30 to 1.75, depending on the chemical structure of the sheath material and the type of particles used.

The charged primary particles are for example high energy electrons, protons, deuterons (deuterium nuclei), helium nuclei, or lithium nuclei. They are generated in electron accelerators or ion accelerators, in which the primary particles are accelerated by electric and/or magnetic fields, or they are filtered out from the ionizing radiation from α-ray emitting radioactive elements.

The irradiation can, insofar as polysiloxanes or fluoropolymers containing vinylidene fluoride are used as the sheath material, occur in air, the windows between the evacuated acceleration chambers of the ion accelerator used and the irradiation space comprising thin berylium foils. Somewhat better results have been obtained using a somewhat more complicated process, in which the optical waveguide was rewound in a closed evacuated chamber and concurrently exposed to ionizing radiation. The latter embodiment of the process has also proved effective in the irradiation of optical waveguides sheathed with polyolefins.

Whatever the type of radiation used, the radiation dose is 50 kGy to 500 kGy, preferably 100 kGy to 400 kGy, particularly preferably 150 kGy to 350 kGy.

The energy of the primary particles used for irradiation should not differ by more than 20%, preferably not more than 10%, from the average energy.

If the energy of the irradiation is selected to be too high, the light attenuation increases, and flexural strength and ultimate tensile strength are impaired. If the optical waveguide is treated with radiation of too low an energy, the long term service temperature is reduced. Too high a radiation dose impairs the flexural strength, too low a dose impairs the heat resistance and, particularly in optical waveguides with thick sheath layers, the ultimate tensile strength at elevated temperature. If radiation of non-uniform energy is used, both the light transmission and the heat resistance and the mechanical properties at the same dose are impaired. If the thickness of the sheath layer used is too low, the light attenuation is greater. Optical waveguides having thick sheath layers exhibit good ultimate tensile strength at high temperature after crosslinking, but the flexural strength is impaired, particularly when high doses of radiation were used.

If a copolymer made from VdF, TFE and HFP is used as sheath materials in optical waveguides, the copolymer is composed of VdF, TFE and HFP in the ratio (30% to 50%) : (25% to 55%) : (15% to 25%), preferably (35% to 45%) : (35 to 45%) : (17% to 22%) and is preferably used in layer thicknesses of 4 to 150 μm, particularly preferably of 6 to 100 μm. The irradiation is carried out with high energy charged primary particles whose energy, expressed in MeV, preferably differs by less than 10% from the mean value and in accordance with the formula (I) is adjusted to the thickness of the sheath layer, expressed in μm, with the aid of parameters A and B. Protons and helium nuclei are preferred as charged particles, the parameters A and B in the formula (I) being A=0.35 to 0.6, preferably 0.40 to 0.47, and B=1.30 to 1.60, preferably 1.42 to 1.50, on irradiation with helium ions and A=1.15 to 1.40, preferably 1.25 to 1.35, and B=1.35 to 1.75, preferably 1.52 to 1.60, on irradiation with protons.

The irradiation of optical waveguides having layers 6 to 100 μm thick made from those fluoropolymers which contain VdF, TFE and HFP in the ratio (35% to 45%) : (35% to 45%) : (17% to 22%), is particularly preferably carried out with rays of high energy protons whose energy is set in accordance with the formula (I) where the parameters A=1.25 to 1.35 and B=1.52 to 1.60.

Moreover, optical waveguides can be produced made from different core materials and from thin layers of amorphous crosslinkable polyolefins as the sheath, the layers being 3 to 150 μm, preferably 3 to 100, particularly preferably 6 to 80 μm thick. Amorphous copolymers made from ethylene and 1-olefins and homopolymers and copolymers of 4-methylpentene are preferably used as sheath materials. Copolymers made from ethylene with propylene and poly-4-methylpentene are particularly preferred. The optical waveguides which have been coated with this polymer, are subsequently irradiated with helium nuclei whose energy is set in accordance with formula (I) with reference to parameters A and B where A=0.35 to 0.7, preferably 0.45 to 0.6, and B=1.30 to 1.70, preferably 1.48 to 1.62. If protons are used for the radiation treatment instead of helium nuclei, the parameter A=1.15 to 1.55, preferably=1.30 to 1.45, and the parameter B=1.30 to 1.70, preferably 1.45 to 1.60.

Moreover, optical waveguides can be produced from different core materials and from thin layers made from polysiloxanes as the sheath, the layers being 3 to 150 μm, preferably 3 to 50 μm, particularly preferably 6 to 30 μm thick. If the polysiloxane is a poly(dimethylsiloxane) (PDMS), the optical waveguide is treated with rays of high energy helium nuclei having an energy which is determined in accordance with the formula (I) from parameters A and B where A=0.55 to 0.8, preferably 0.65 to 0.75, and B=1.00 to 1.30, preferably 1.15 to 1.22.

Optical waveguides with PDMS as the sheath material, which exhibit similar properties, are also produced if the optical waveguide is treated with rays of high energy protons instead of with helium nuclei. The energy of the protons is established in accordance with the formula (I) from parameters A and B where A=1.30 to 1.60, preferably 1.35 to 1.47, and B=1.30 to 1.55, preferably 1.40 to 1.45. The radiation is used on sheath layers having a thickness of 3 to 150 μm, preferably 3 to 50 μ, m, particularly preferably 6 to 30 μm.

The optical waveguide according to the invention exhibits an excellent optical transparency, as long as all solid particulate and soluble impurities are carefully eliminated and excluded during production of the polymer materials and of the optical waveguide. The optical transparency of a fiber of this type is generally expressed by the attenuation D, the reciprocal of optical transparency, in accordance with the formula $$D = 10 \times \log (I/I_o)/1,$$

in units of dB/km. In the formula, I denotes the intensity of the light at the end of the optical waveguide, $I_o$ the intensity at the start of the optical waveguide, and l the length of the optical waveguide in km.

An optical waveguide with a sheath made from crosslinkable material which has been treated according to the invention with the abovementioned dose of ionizing radiation of charged primary particles of the given uniform energy, simultaneously exhibits very low attenuation, a high long term service temperature and good mechanical properties, meaning that it withstands high tensile loads (high ultimate tensile strength) and can be bent into small radii (high flexural strength), without the optical waveguide breaking or the optical transparency being significantly reduced.

The invention is explained in more detail using the following examples, in which the attenuation of an optical waveguide is determined in the following way:

Using a suitable light source, light was introduced into one end of a 10 to 30 m long optical fiber, while at the other end the intensity of the emerging light was measured. The optical fiber was subsequently shortened in each case by an exactly determined length of about 1 meter and the emerging light intensity was measured again. The attenuation can be determined from the gradient using a logarithmic plot of the measured light intensities against the corresponding length of optical waveguide.

For the duration of the measurement of the temperature dependence of attenuation, the connections between light source and light detector and optical waveguide were not altered, but merely an exactly determined part of the optical waveguide was maintained at the measuring temperature in an air bath in a climatic test cabinet. The variation of attenuation in the temperature conditioned part of the optical waveguide can be calculated from the weakening in the light intensity at the outlet of the optical waveguide and from the length of the temperature conditioned section of fiber.

For measuring flexibility, the connections between light source and light detector and the optical waveguide were not altered after the first measurement of the emerging light intensity. A part of the optical fiber in the middle of the measured section was wound three times around a cylindrical rod and unwound again from the rod and subsequently the intensity of the emerging light was measured. If the intensity of the light had not reduced or not significantly reduced, the procedure was repeated with a rod of smaller diameter. The smallest bending radius admissible without impairment of the quality of the optical waveguide is a measure of the flexibility of the optical waveguide.

EXAMPLE 1

Initially, a copolymer made from TFE, HFP and VdF was produced in a known manner in a suspension process. The aqueous liquor contained perfluorooctanoic acid as emulsifier and potassium hydrogensulphate as buffer. Ammonium persulphate was the initiator. 45% by weight of TFE, 20% by weight of HFP and 40% by weight of VdF were polymerized at a temperature of 70°C. and a pressure of 9 bar. Diethyl malonate was the regulator.

The product was soluble in methyl ethyl ketone and other solvents. A 1% strength solution had a reduced specific viscosity at 25°C. of 87 cm$^3$/g. A weight average molecular weight of 177,000 was determined using gel permeation chromatography (in tetrahydrofuran as solvent, measured using a calibration curve from standard preparations of polystyrene). The composition of the polymer was determined by 19-F-NMR spectroscopy as 40 parts by weight of TFE, 20 parts of HFP and 40 parts of VdF. The refractive index of the copolymer was $n_D^{25} = 1.366$.

Only very small proportions of crystallinity were detectable by DSC.

EXAMPLE 2

100 parts by weight of methyl methacrylate were freed from impurities by distillation and filtration through a fine-pore membrane filter, mixed with 0.1 part of dicumyl peroxide and 0.3 part of dodecyl mercaptan and continuously added to a stirred reactor heated to 100° to 130° C. In the reactor a syrup-like viscous mass was formed from the monomers, comprising monomer and polymer, and was continuously transferred from the reactor into a twin screw extruder. In the twin screw extruder the proportion of polymer increased due to continued polymerization at 120° to 170° C. to 80% to 100% conversion. Excess free monomer was removed in vacuo in the degassing zone of the extruder. The resulting polymer was free from volatile constituents and had an average degree of polymerization (weight average) $P_w=1100$.

A copolymer made from VdF, TFE and HFP was produced as in Example 1 and melted in a single screw extruder. In a two component spinneret, PMMA (average degree of polymerization $P_w=1100$) was processed to form the core, and VdF copolymer was processed to form the sheath of an optical waveguide. The settings of the spinning equipment were adjusted in such a way that a fiber 1 mm in diameter resulted with a layer thickness of the sheath material of 10 μm.

At room temperature, the optical waveguide exhibited an attenuation of 250 dB/km at 650 nm. At 70°C., the attenutation increased slightly to a value of 280 dB/km and only increased more rapidly at still higher temperatures. The attenuation value remained unchanged when the optical waveguide was wound around a rod having a diameter 10 mm. The ultimate tensile strength of the fiber at 25°C. was 10 cN/tex.

A piece of this optical waveguide 400 m long was subsequently transferred to an evacuated chamber and moved six times back and forth over a roller system in front of the outlet slit of an electron accelerator, so that it was exposed as uniformly as possible on all sides to irradiation having an energy of 600 keV in a dose of 200 kGy.

At room temperature, the irradiated optical waveguide had an attenuation of 260 dB/km at 650 nm. At 120°C., the attenuation increased slightly to a value of 320 dB/km and only increased more rapidly at still higher temperatures. The attenuation value remained unchanged when the optical waveguide was wound around a rod having a diameter of 10 mm. The ultimate tensile strength of the fiber at 25°C. was 10 cN/tex, and at 120°C., 2 cN/tex.

EXAMPLE 3

An optical waveguide was produced as described in Example 2 and irradiated in vacuo uniformly on all sides with 200 kGy of high energy helium nuclei of 2.4 MeV from an ion accelerater.

The irradiated optical waveguide had an attenuation of 280 dB/km at 650 nm. The attenuation remained constant up to a temperature of 70°C., and increased at higher temperatures to 350 dB/km at 110°C. and 650 nm. If the optical waveguide was cooled again, the attenuation values fell back again to the initial values. The attenuation did not increase when the optical waveguide was wound around a rod having a diameter of 10 mm. The ultimate tensile strength was 10 cN/tex at 25°C., 1.5 cN/tex at 100° C.

EXAMPLE 4

An optical waveguide was produced as described in Example 2 and irradiated in vacuo uniformly on all sides with 200 kGy of high energy protons of 630 keV from an ion accelerator.

The irradiated optical waveguide had an attenuation of 240 dB/km at 650 nm. The attenuation remained constant up to a temperature of 70°C., and increased at higher temperatures to 300 dB/km at 110°C. and 650 nm. If the optical waveguide was cooled again, the attenuation values fell back again to the original values. The attenuation did not increase when the optical waveguide was wound around a rod having a diameter of 10 mm. The ultimate tensile strength was 10 cN/tex at 25°C., 1.5 cN/tex at 100° C.

EXAMPLE 5

An optical waveguide was produced in the same manner as in Example 2 with the difference that the settings of the extrusion apparatus were adjusted in such a way that the layer thickness of the sheath material was 100 μm. It was then irradiated in vacuo uniformly on all sides with 200 kGy of high energy protons of 2.8 MeV from an ion accelerator.

The irradiated optical waveguide had an attenuation of 290 dB/km at 650 nm. The attenuation remained approximately constant up to a temperature of 70°C., and increased at higher temperatures to 340 dB/km at 110°C. and 650 nm. If the optical waveguide was cooled again, the attenuation values fell back to the original values. The attenuation did not increase when the optical waveguide was wound around a rod having a diameter of 25 mm. The ultimate tensile strength was 10 cN/tex at 25°C., 2 cN/tex at 120°C.

COMPARATIVE EXAMPLE A

An optical waveguide was produced as in Example 2 with the difference that, the layer thickness of the sheath material was 100 μm. It was irradiated in vacuo uniformly on all sides with 200 kGy of high energy protons of 4.3 MeV from an ion accelerator.

The irradiated optical waveguide had an attenuation of 900 dB/km at 650 nm.

COMPARATIVE EXAMPLE B

An optical waveguide was produced as in Example 2 with the difference that the layer thickness of the sheath material was 30 μm. It was irradiated in vacuo uniformly on all sides with 200 kGy of high energy protons of 1.0 MeV from an ion accelerator.

The irradiated optical waveguide had an attenuation of 240 dB/km at 650 nm. The attenuation increased to 280 dB/km at 650 nm up to a temperature of 70°C. and to 1500 dB/km up to a temperature of 120°C. If the optical waveguide was cooled again, the attenuation values did not fall below 1000 dB/km.

COMPARATIVE EXAMPLE C

An optical waveguide which had been produced as described in Example 2 was irradiated in vacuo uniformly on all sides with 200 kGy of high energy protons of 630 keV from an ion accelerator.

The irradiated optical waveguide had an attenuation of 280 dB/km at 650 nm. The attenuation increased to 1300 dB/km when the optical waveguide was wound around a rod having a diameter of 15 mm.

EXAMPLE 6

In a two component spinneret, PMMA (average degree of polymerization $P_w=1100$) was processed to form the core, and polydimethylsiloxane to form the sheath of an optical waveguide. The settings of the spinning equipment were adjusted in such a way that a fiber having a diameter of 1 mm resulted, whose sheath layer was 10 μm in thickness.

Directly after leaving the extrusion equipment, the optical waveguide was moved six times back and forth on a roller system at a distance of a few millimeters in each of the six instances from a thin longitudinal window of an ion accelerator covered with a 2 μm thick foil of beryllium, the movement being in the longitudinal direction of the window, in such a way that the optical waveguide was exposed as uniformly as possible on all sides to irradiation by protons having an energy of 850 keV at a dose of 200 kGy.

At room temperature, the irradiated optical waveguide had an attenuation of 360 dB/km at 650 nm. At 120°C., the attenuation increased slightly to a value of 440 dB/km and only increased more rapidly at still higher temperatures. The attenuation value remained unchanged when the optical waveguide was wound around a rod having a diameter of 5 mm. The ultimate tensile strength of the fiber at 25°C. was 8 cN/tex, and at 120°C., 1.5 cN/tex.

EXAMPLE 7

Pentachlorophenyl acrylate was purified by repeated recrystallization from toluene, the toluene solution having been freed from particulate impurities by filtration through a fine-pore membrane filter prior to the final crystallization of the acrylate.

17 parts by weight of MMA, 83 parts by weight of PCP-A, 0.1 part by weight of tert.-butyl peroxide and 0.3 part by weight of dodecyl mercaptan were stirred together at 90°C. to form a partly solid, partly liquid mixture, which was added continuously at this temperature to a stirred reactor which was adjusted to an operating temperature of 130°C. The clear, syrup like viscous mixture of monomers and polymers was continuously fed to a twin screw degassing extruder, polymerized further at 130° to 180°C. and freed from excess polymers in vacuo in a degassing zone. The polymer was free of volatile constituents and had an average degree of polymerization $P_w$ of 900. The glass transition temperature of the copolymer was 150°C. (measured by DSC), and the refractive index was 1.57.

An optical waveguide was continuously produced in accordance with Example 2 from this copolymer and the copolymer made from VdF, TFE and HFP referred to in Example 1, the settings of the two component spinning equipment being adjusted in such a way, that a waveguide 0.5 mm in diameter and having a layer thickness of the sheath material of 10 μm resulted. The optical waveguide was treated with 200 kGy of electron radiation of 600 keV.

The optical waveguide produced in this manner had a light attenuation of 1230 dB/km at 25°C., 1290 dB/km at 70°C. and 1350 dB/km at 150°C. at 650 nm. At still higher temperatures the attenuation quickly increased to values above 2000 dB/km, measured at 180°C., but fell again to 1400 dB/km at 120°C. and 1250 dB/km at 25°C.

The optical waveguide had an ultimate tensile strength of 5 cN/tex at 25°C. and 4 cN/tex at 110°C. and could be wound around a circular rod having a diameter of 25 mm without any loss of optical transparency.

EXAMPLE 8

Polycarbonate (glass transition temperature: 145°C.) was melted using a twin screw degassing extruder and processed as the core in combination with the sheath material, a copolymer made from VdF, TFE and HFP (in the ratio by weight 43:38:19), in a two component die to form an optical waveguide.

The optical waveguide had a diameter of 0.5 mm, and the mantle had a layer thickness of 10 μm. It was treated with 200 kGY of electron radiation with an energy of 600 keV.

The optical waveguide had a light attenuation of 980 dB/km at 25°C. and 1030 dB/km at 130°C. and 650 nm. Admittedly, the light attenuation increased to over 2000 dB/km on further heating to 150°C., but after cooling the original values were virtually recovered (1020 dB/km at 25°C.).

The optical waveguide had an ultimate tensile strength of 6 cN/tex at 25°C. and of 4 cN/tex at 120°C. and could be wound around a circular rod having a diameter of 12 mm without any loss of optical transparency.

EXAMPLE 9

Polycarbonate was melted using a twin screw degassing extruder and processed as the core in combination with the sheath material poly-4-methylpentene in a two component die to form an optical waveguide.

The optical waveguide had a diameter of 0.5 mm, and the sheath had a layer thickness of 10 μm. It was treated with 200 kGy of proton radiation with an energy of 550 keV.

The optical waveguide had an attenuation of 950 dB/km at 25° and 1080 dB/km at 130°C. and 650 μm. The light attenuation admittedly increased to above 2000 dB/km on heating to 160°C., but after cooling the original values were almost recovered (970 dB/km at 25°C.).

EXAMPLE 10

An optical waveguide was produced in the manner described in Example 2, where instead of the given mixture made from MMA, dicumyl peroxide and dodecyl mercaptan, a mixture of 30 parts by weight of MMA, 62 parts by weight of norbornyl methacrylate and 1 part by weight of methyl acrylate as well as 0.1 part by weight of tert.-butyl peroxide and 0.3 part by weight of dodecyl mercaptan was added to the reactor at a polymerization temperature of 130°C. The product which had been polymerized in an extruder with a degassing zone and freed from volatile constituents had a degree of polymerization $P_w$ of 850. The glass transition temperature, determined by the DSC method, was 151°C.

The optical waveguide had a diameter of 0.5 mm, and the sheath had a layer thickness of 10 μm. The optical waveguide was treated with 200 kGy of electron radiation of 600 keV.

The optical waveguide exhibited a light attenuation of 710 dB/km at 25°C. and 780 dB/km at 100°C. and 650 nm. Admittedly, the light attenuation increased to over 2000 dB/km on further heating to 150°C., but after cooling the original values were almost recovered (750 dB/km at 25°C.).

The optical waveguide had an ultimate tensile strength of 6 cN/tex at 25°C. and 3 cN/tex at 110°C. and could be wound around a circular rod having a diameter of 25 mm without any loss of optical transparency.

We claim:

1. An optical waveguide having a core/sheath structure whose core comprises a polymer with a refractive index n(c) and whose sheath comprises a polymer with a refractive index n(S), where n(C)/n(S)>1.01, wherein the core comprises a polycarbonate, or a polymer which contains units selected from the group consisting of units which are derived from styrene, from a substituted styrene, from an acrylate, from a methacrylate or from a fluoracrylate, and the sheath comprises a polymer which contains units selected from the group consisting of units which are derived from siloxanes, from 1-olefins, or, based in each case on the polymer, from
   30% to 50% by weight of vinylidene fluoride, from
   25% to 55% by weight of tetrafluorethylene and from
   15% to 25% by weight of hexafluoropropylene, and the optical waveguide has been treated with high energy rays of charged primary particles whose energy has been determined from the formula (I)

$$\log E = (-A+L)/B \qquad (I)$$

in which
   E is the energy of the particles in MeV and
   L is the thickness of the sheath material in $\mu m$, and
   A and B are empirically determined parameters which are dependent on the chemical structure of the sheath material and the type of particle used wherein A ranges in value from 0.35 to 1.60, and B ranges in value from 1.30 to 1.75.

2. An optical waveguide as claimed in claim 1, wherein the sheath comprises a polymer which contains units which, based in each case on the polymer, are derived from
   35% to 45% by weight of vinylidene fluoride, from
   35% to 45% by weight of tetrafluorethylene and from
   17% to 22% by weight of hexafluoropropylene.

3. An optical waveguide as claimed in claim 1, wherein the sheath material comprises poly(dimethylsiloxane) (PDMS).

4. An optical waveguide as claimed in claim 1, wherein the core comprises a polymer which contains units selected from the group consisting of units which are derived from α-fluoroacrylates, acrylates or methacrylates of halogenated phenols or of halogenated bicycloheptenols.

5. An optical waveguide as claimed in claim 1, wherein the core comprises a polycarbonate.

6. The use of the optical waveguide as claimed in claim 1 for transmitting light signals in data processing installations.

7. A process for the production of an optical waveguide having a core/sheath structure, whose core comprises a polymer with a refractive n(C) and whose sheath comprises a polymer with a refractive index n(S), where n(C)/n(S)>1.01, comprising the step of:
   extruding the core from a polycarbonate, or from a polymer which contains units selected from the group consisting of units which are derived from styrene, from a substituted styrene, from an acrylate, from a methacrylate or from a fluoroacrylate,
   encasing the core by a sheath made from a polymer which contains units selected from the group consisting of units which are derived from siloxanes or from 1-olefins or, based in each case on the polymer, from
   30% to 50% by weight of vinylidene fluoride, from
   25% to 55% by weight of tetrafluoroethylene and from
   15% to 25% by weight of hexafluoropropylene,
   irradiating the optical waveguide with high energy rays of charged primary particles, whose energy has been determined from the formula (I)

$$\log E = (-A+\log L)/B \qquad (I)$$

in which
   E is the average energy of the particles in MeV and
   L is the thickness of the sheath material in $\mu m$, and
   A and B are empirically determined parameters which are dependent on the chemical structure of the sheath material and the type of particle used wherein A ranges in value from 0.35 to 1.60 and B ranges in value from 1.30 to 1.75.

8. The process as claimed in claim 7, wherein the core and the sheath are produced simultaneously by coextrusion.

9. The process as claimed in claim 6, wherein the irradiation is carried out with particles selected from the group consisting of high energy electrons, protons, deuterons, helium nuclei, and nuclei of other light elements.

10. The process as claimed in claim 7, wherein the mean deviation of the energy of the primary particles used for the irradiation is less than 20% of the mean energy.

* * * * *

UNITED STATES PATENT AND TRADEMARK OFFICE
CERTIFICATE OF CORRECTION

PATENT NO. : 4,986,630
DATED : January 22, 1991
INVENTOR(S) : Peter Herbrechtsmeier et al.

It is certified that error appears in the above-identified patent and that said Letters Patent is hereby corrected as shown below:

Col. 2, line 39

"$\log E = (-A+L)/B$"

should read

--$\log E = (-A + \log L)/B$--.

Claim 1, col. 11, line 28

"$\log E = (-A + L)/B$"

should read

--$\log E = (-A + \log L)/B$--.

Signed and Sealed this

Eighteenth Day of August, 1992

Attest:

DOUGLAS B. COMER

Attesting Officer     Acting Commissioner of Patents and Trademarks